US012655804B2

(12) United States Patent
Malkus et al.

(10) Patent No.: US 12,655,804 B2
(45) Date of Patent: Jun. 16, 2026

(54) AERO-ACOUSTICALLY DAMPENED BLEED VALVE

(71) Applicant: General Electric Company, Evendale, OH (US)

(72) Inventors: Thomas Malkus, Albany, NY (US); Trevor H. Wood, Clifton Park, NY (US); Giridhar Jothiprasad, Clifton Park, NY (US); Nageswar Ganji, Bengaluru (IN); Hiranya Kumar Nath, Bengaluru (IN); Ravindra Shankar Ganiger, Bengaluru (IN); Ambika Shivamurthy, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/952,677

(22) Filed: Nov. 19, 2024

(65) Prior Publication Data

US 2025/0075664 A1    Mar. 6, 2025

Related U.S. Application Data

(63) Continuation of application No. 18/353,741, filed on Jul. 17, 2023, now Pat. No. 12,180,897, which is a (Continued)

(30) Foreign Application Priority Data

Jan. 19, 2022    (IN) ............................. 202211003034

(51) Int. Cl.
    *F02C 9/18*       (2006.01)
    *F01D 17/10*      (2006.01)
    (Continued)

(52) U.S. Cl.
    CPC .............. *F02C 9/18* (2013.01); *F01D 17/105* (2013.01); *F02C 7/052* (2013.01);
    (Continued)

(58) Field of Classification Search
    CPC .. F04D 27/0215; F04D 27/023; F04D 29/665; F02C 6/08; F02C 9/18;
    (Continued)

(56) References Cited

U.S. PATENT DOCUMENTS 3,563,340 A    2/1971  Duthion
3,674,248 A    7/1972  Shellenberger
(Continued)

FOREIGN PATENT DOCUMENTS

CN    107237694 A    10/2017
CN    108799202 A    11/2018
(Continued)

OTHER PUBLICATIONS

Sato et al, "Development of PW1100G-JM Turbofan Engine," IHI Engineering Review, vol. 47, No. 1, 2014, 6 pages.
(Continued)

*Primary Examiner* — Loren C Edwards
(74) *Attorney, Agent, or Firm* — Hanley, Flight & Zimmerman, LLC

(57) ABSTRACT

Aero-acoustically damped bleed valves are disclosed. An example variable bleed valve apparatus comprises a variable bleed valve door to actuate the variable bleed valve apparatus, and a variable bleed valve port including an upstream edge and a downstream edge, the VBV port to define a secondary flowpath, the VBV door to cover the VBV port in a closed position, and a vortex device at the upstream edge of the variable bleed valve port, the vortex device including a vorticity generating feature along the upstream edge of the variable bleed valve port.

18 Claims, 10 Drawing Sheets

Related U.S. Application Data continuation of application No. 17/684,172, filed on Mar. 1, 2022, now Pat. No. 11,739,698.

(51) Int. Cl.
*F02C 7/052* (2006.01)
*F04D 27/02* (2006.01)

(52) U.S. Cl.
CPC ....... *F04D 27/0215* (2013.01); *F04D 27/023* (2013.01); *F05D 2250/42* (2013.01)

(58) Field of Classification Search
CPC ................. F02C 7/052; F05D 2260/96; F05D 2260/963; F05D 2250/42; F01D 17/105; F16K 47/08
See application file for complete search history.

(56) References Cited

U.S. PATENT DOCUMENTS

| | | | |
|---|---|---|---|
| 3,819,009 A | | 6/1974 | Motsinger |
| 4,723,626 A | | 2/1988 | Carr |
| 4,796,429 A | | 1/1989 | Verdouw |
| 4,979,587 A | * | 12/1990 | Hirt ...................... F04D 29/522 |
| | | | 181/269 |
| 7,730,995 B2 | * | 6/2010 | Hunt ................... F04D 27/0215 |
| | | | 60/785 |
| 8,136,342 B2 | | 3/2012 | Bertolotti et al. |
| 8,540,483 B2 | | 9/2013 | Bintz et al. |
| 8,590,308 B2 | * | 11/2013 | Kirby ...................... F02K 3/075 |
| | | | 60/725 |
| 8,683,812 B2 | | 4/2014 | Bertolotti et al. |
| 8,931,284 B2 | | 1/2015 | Hussain et al. |
| 9,518,513 B2 | | 12/2016 | Pritchard, Jr. et al. |
| 9,638,201 B2 | | 5/2017 | LeBlanc et al. |
| 9,657,844 B2 | | 5/2017 | Hrdlichka et al. |
| 9,879,611 B2 | | 1/2018 | Morin et al. |
| 9,982,598 B2 | | 5/2018 | Pritchard, Jr. et al. |
| 10,830,179 B2 | | 11/2020 | Hatim |
| 11,022,047 B2 | | 6/2021 | Zsurka et al. |
| 11,739,698 B2 | | 8/2023 | Malkus et al. |
| 11,988,113 B2 | | 5/2024 | Vandemark |
| 2008/0296439 A1 | | 12/2008 | Cloft et al. |
| 2012/0006615 A1 | * | 1/2012 | Klasing .................... F02C 6/08 |
| | | | 137/561 A |
| 2013/0340440 A1 | | 12/2013 | Leblanc |
| 2016/0130972 A1 | | 5/2016 | Kozuch et al. |
| 2017/0284303 A1 | | 10/2017 | Johnson |
| 2018/0313364 A1 | | 11/2018 | Moeckel |
| 2019/0360398 A1 | | 11/2019 | Qiu et al. |

FOREIGN PATENT DOCUMENTS

| | | |
|---|---|---|
| CN | 110513162 A | 11/2019 |
| FR | 2112278 A1 | 5/2023 |
| FR | 3129428 A1 | 5/2023 |
| FR | 3129432 A1 | 5/2023 |
| FR | 3130879 A1 | 6/2023 |
| FR | 3130894 A1 | 6/2023 |
| FR | 3132743 A1 | 8/2023 |

OTHER PUBLICATIONS

China National Intellectual Property Administration, "First Office Action," issued in connection with Chinese Patent Application No. 202310019035.9, dated Dec. 5, 2023, 7 pages. [English language machine translation included.].

The State Intellectual Property Office of People's Republic of China, "Notification of grant of patent right for invention," mailed in connection with Chinese Patent Application No. 202310019035. 9, dated Apr. 25, 2024, 3 pages. [English language machine translation included.].

* cited by examiner

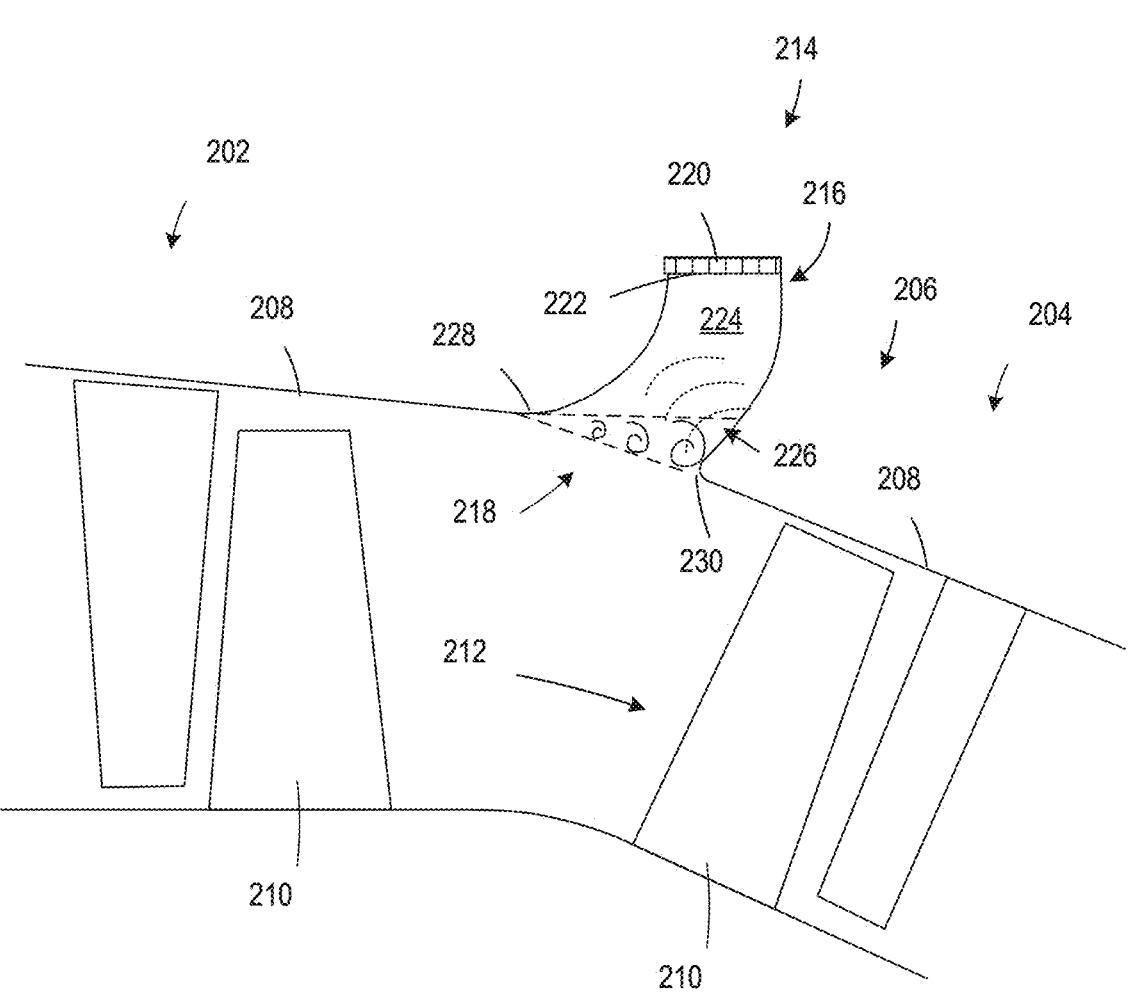
FIG. 2
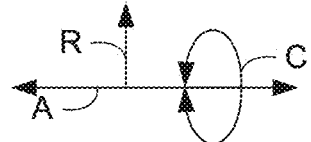

AERO-ACOUSTICALLY DAMPENED BLEED VALVE

RELATED APPLICATIONS

This patent arises from a continuation of U.S. patent application Ser. No. 18/353,741, filed on Jul. 17, 2023, which arises from a continuation of Ser. No. 17/684,172 (now U.S. Pat. No. 11,739,698), filed on Mar. 1, 2022, which claims the benefit of Indian patent application Ser. No. 202211003034, filed on Jan. 19, 2022. U.S. patent application Ser. No. 18/353,741, U.S. patent application Ser. No. 17/684,172 and Indian patent application Ser. No. 202211003034 are hereby incorporated herein by reference in their entireties. Priority to U.S. patent application Ser. No. 18/353,741, U.S. patent application Ser. No. 17/684,172 and Indian patent application Ser. No. 202211003034 is hereby claimed.

FIELD OF THE DISCLOSURE

This disclosure relates generally to turbine engines and, more particularly, to an aero-acoustically dampened bleed valve.

BACKGROUND

Turbine engines are some of the most widely-used power generating technologies, often being utilized in aircraft and power-generation applications. A turbine engine generally includes a fan and a core arranged in flow communication with one another. The core of the turbine engine generally includes, in serial flow order, a compressor section, a combustion section, a turbine section on the same shaft as the compressor section, and an exhaust section. Typically, a casing or housing surrounds the core of the turbine engine.

BRIEF DESCRIPTION OF THE DRAWINGS

FIG. 2 is an illustration of an example variable bleed valve port for which examples disclosed herein may be implemented.

Figure 1:
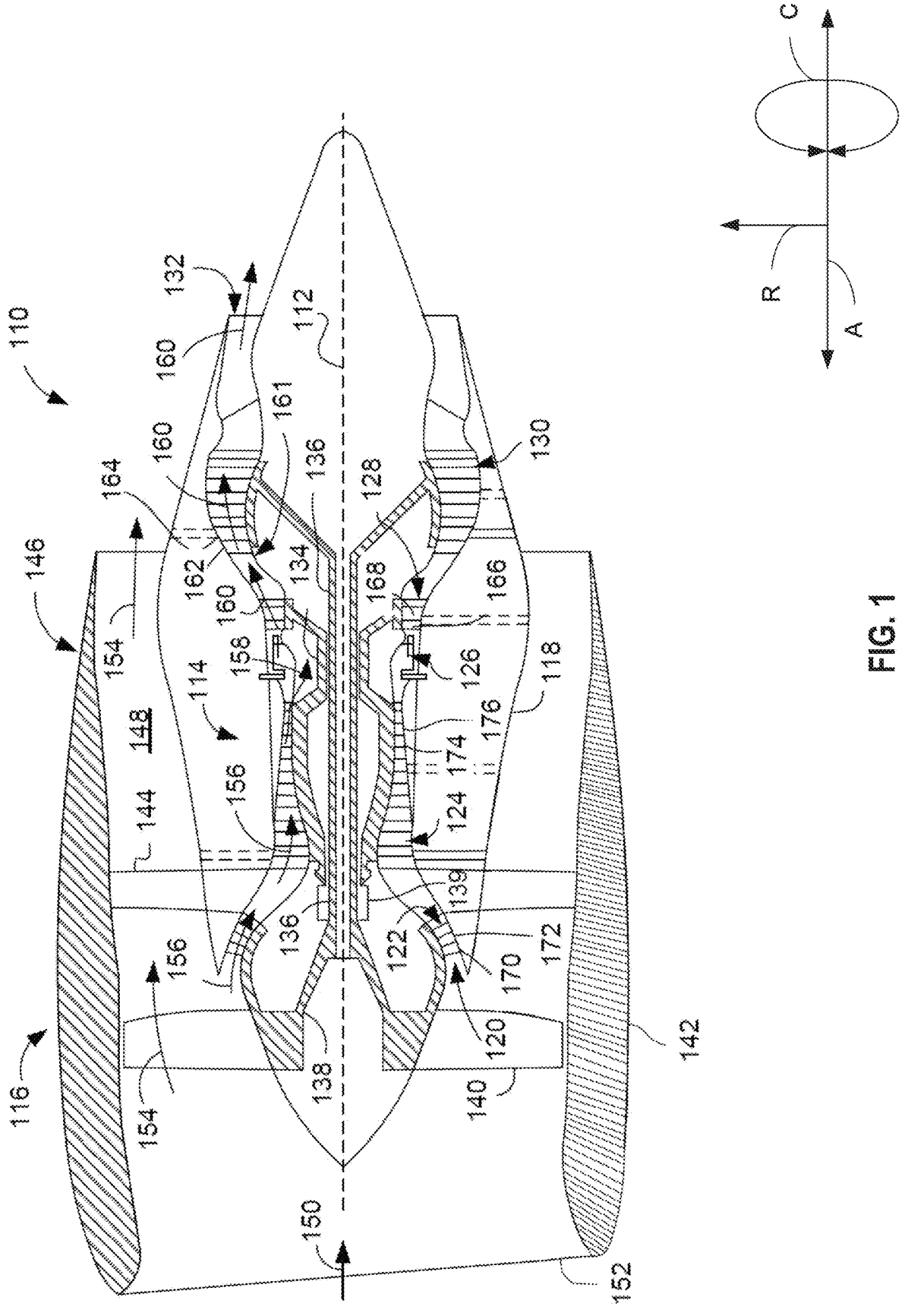
FIG. 1 is a cross-sectional view of an example gas turbine engine in which examples disclosed herein may be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In some examples used herein, the term "substantially" is used to describe a relationship between two parts that is within three degrees of the stated relationship (e.g., a substantially collinear relationship is within three degrees of being linear, a substantially perpendicular relationship is within three degrees of being perpendicular, a substantially parallel relationship is within three degrees of being parallel, a substantially flush relationship is within three degrees of being flush, etc.).

The terms "upstream" and "downstream" refer to the relative direction with respect to fluid flow in a fluid pathway. For example, "upstream" refers to the direction from which the fluid flows, and "downstream" refers to the direction to which the fluid flows. Various terms are used herein to describe the orientation of features. In general, the attached figures are annotated with reference to the axial direction, radial direction, and circumferential direction of the vehicle associated with the features, forces and moments. In general, the attached figures are annotated with a set of axes including the axial axis A, the radial axis R, and the circumferential axis C.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

DETAILED DESCRIPTION

A turbine engine, also referred to herein as a gas turbine engine, is a type of internal combustion engine that uses atmospheric air as a moving fluid. In operation, atmospheric air enters the turbine engine via a fan and flows through a compressor section where one or more compressors progressively compresses (e.g., pressurizes) the air until it reaches the combustion section. In the combustion section, the pressurized air is combined with fuel and ignited to produce a high-temperature, high-pressure gas stream (e.g., hot combustion gas) before entering the turbine section. The hot combustion gases expand as they flow through a turbine section, causing rotating blades of one or more turbines to spin. The rotating blades of the turbine produce a spool work output that powers a corresponding compressor. The spool is a combination of the compressor, a shaft, and the turbine. Turbine engines often include multiple spools, such as a high pressure spool (e.g., HP compressor, shaft, and turbine) and a low pressure spool (e.g., LP compressor, shaft, and turbine). However, a turbine engine can include one spool or more than two spools in additional or alternative examples.

During low speed operation of the turbine engine (e.g., during start-up and/or stopping), equilibrium of the engine is adjusted. In many scenarios, a delay is needed for the spool(s) to adapt (e.g., a time for a rotational speed to adjust for a new equilibrium). However, the compressor cannot stop producing pressurized air for the fuel combustion during operation. Such a result may cause the turbine to stop producing the power to turn the compressor, causing the compressor itself to stop compressing air. Accordingly, throttling changes may lead to compressor instabilities, such as compressor stall and/or compressor surge. Compressor stall is a circumstance of abnormal airflow resulting from the aerodynamic stall of rotor blades within the compressor. Compressor stall causes the air flowing through the compressor to slow down or stagnate. In some cases, the disruption of air flow as the air passes through various stages of the compressor can lead to compressor surge. Compressor surge refers to a stall that results in disruption (e.g., complete disruption, majority disruption, other partial disruption, etc.) of the airflow through the compressor.

A variable bleed valve (VBV) is often integrated into a compressor to increase efficiency and limit possible stalls. The VBV enables the turbine engine to bleed air from a compressor section of the turbine engine during operation. An example VBV assembly includes a VBV port (e.g., opening, air bleed slot, etc.) integrated into a compressor casing that opens via actuation of a VBV door. In other words, the VBV is configured as a door that opens to provide a bleed flowpath to bleed off compressed air between a booster (e.g., a low pressure compressor) and a core engine compressor of a gas turbine. For example, the VBV door may be actuated during a speed-speed mismatch between the LP spool and the HP spool. During start-up or stopping, the HP spool may spin at a lower speed than the LP spool. Opening the VBV port allows the LP spool to maintain its speed while reducing the amount of air that is flowing through the axial compressor by directing some of the air flow to the turbine exhaust area. Thus, the VBV door enables the LP spool (e.g., booster) to operate on a lower operating line and further away from a potential instability or stall condition.

When a VBV is in a closed position, the VBV door may not be flush with the compressor casing, resulting in a bleed cavity that is open to a main flow path within the compressor. As air flows through the compressor, the airflow may encounter an upstream edge of the bleed cavity. In some examples, a shear layer of the airflow separates and impinges a downstream edge of the VBV port, resulting in acoustic wave feedback. When the feedback resonates with the bleed cavity, energetic acoustic tones emanate from the bleed cavity and interact with surrounding hardware. The acoustic tones often resonate with other mechanical components of the turbine engine, which can lead mechanical failure. Accordingly, a new VBV assembly is needed that addresses the issues described above.

Examples disclosed herein enable manufacture of a VBV port that dampens an acoustic resonant response within the bleed cavity generated by an impingement of a shear layer of mainstream airflow with a downstream edge of the VBV port. Certain examples disclosed herein include a vortex generating device at an upstream (e.g., separation) edge of the VBV port to dampen an acoustic level associated with airflow over the closed bleed cavity. For example, the vortex generating device generate streamwise vortices to mix and/or disturb a shear layer of airflow that passes over the bleed cavity in a closed position. That is, the vortex generating device may break up the shear layer and subsequently remove energy from the feedback resonance. Such weakening of the acoustic resonance eliminates and/or otherwise reduces the source of excitation of mechanical components of the turbine engine generated in the bleed cavity. Thus, certain examples may suppress an overall acoustic tone generated in the bleed cavity.

Certain examples disclosed herein include an interaction decorrelating device at a downstream of the VBV port. The interaction decorrelating device is similar in structure (e.g., shape, length, etc.) to the vortex generating device at the upstream lip. While the upstream vortex generating device removes energy from the shear layer, the interaction decorrelating device at the downstream edge is structured to take out additional energy, reducing the acoustic response even further. That is, the interaction decorrelating device is structured to decorrelate the acoustic response of the downstream edge to the impinging shear layer to further weaken the VBV cavity acoustic resonance.

Certain examples disclosed herein include a resonant (e.g., resonating) chamber (e.g., cavity, etc.) at a wall of the bleed cavity. For example, the resonant chamber may be positioned aft and/or forward of the bleed cavity. An opening in the bleed cavity to the resonant chamber allows acoustic waves to enter the resonant chamber. The resonant chamber, which is tuned to a frequency of the acoustic waves, attenuates the acoustic waves to eliminate or otherwise reduce resonance within the bleed cavity. In some examples, the resonant chamber is in the form of an acoustic liner. The acoustic liner may define a wall of the bleed cavity. In additional or alternative examples, the acoustic liner is positioned at a ceiling of the bleed cavity, below a VBV door. Certain examples thus improve aerodynamic efficiency and minimize or otherwise reduce aero-acoustic excitations in the bleed cavity.

Certain examples include a porous face sheet having a plurality of apertures at an entrance of the bleed cavity. In some examples, the porous face sheet is a wire mesh layer. The porous face sheet is structured to provide a resistance to the acoustic tones generated in the bleed cavity. Further, the porous face sheet allows air to pass over the bleed cavity without forming a shear layer. Certain examples include a second porous sheet spaced apart from a first porous face sheet to define a sandwich structure. The sandwich structure includes the two porous face sheets and a volume gap positioned between the porous face sheets. In such examples, air entering the bleed cavity passes through the apertures of the sandwich structure and the volume gap positioned therebetween, which is tuned to a frequency of the acoustic tones. As a result, the acoustic tones may by attenuated before they enter the bleed cavity, thus reducing a resultant resonance.

Referring now to the drawings, wherein identical numerals indicate the same elements throughout the figures, FIG. 1 is a schematic cross-sectional view of an example high-bypass turbofan-type gas turbine engine 110 ("turbofan engine 110"). While the illustrated example is a high-bypass turbofan engine, the principles of the present disclosure are also applicable to other types of engines, such as low-bypass turbofans, turbojets, turboprops, etc. As shown in FIG. 1, the turbofan engine 110 defines a longitudinal or axial centerline axis 112 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 112, the radial direction R is a direction that extends orthogonally outwardly from the centerline axis 112, and the circumferential direction C is a direction that extends concentrically around the centerline axis 112.

In general, the turbofan engine 110 includes a core turbine or gas turbine engine 114 disposed downstream from a fan section 116. The core turbine 114 includes a substantially tubular outer casing 118 that defines an annular inlet 120. The outer casing 118 can be formed from a single casing or multiple casings. The outer casing 118 encloses, in serial flow relationship, a compressor section having a booster or low pressure compressor 122 ("LP compressor 122") and a high pressure compressor 124 ("HP compressor 124"), a combustion section 126, a turbine section having a high pressure turbine 128 ("HP turbine 128") and a low pressure turbine 130 ("LP turbine 130"), and an exhaust section 132. A high pressure shaft or spool 134 ("HP shaft 134") drivingly couples the HP turbine 128 and the HP compressor 124. A low pressure shaft or spool 136 ("LP shaft 136") drivingly couples the LP turbine 130 and the LP compressor 122. The LP shaft 136 can also couple to a fan spool or shaft 138 of the fan section 116. In some examples, the LP shaft 136 is coupled directly to the fan shaft 138 (e.g., a direct-drive configuration). In alternative configurations, the LP shaft 136 can couple to the fan shaft 138 via a reduction gear 139 (e.g., an indirect-drive or geared-drive configuration).

As shown in FIG. 1, the fan section 116 includes a plurality of fan blades 140 coupled to and extending radially outwardly from the fan shaft 138. An annular fan casing or nacelle 142 circumferentially encloses the fan section 116 and/or at least a portion of the core turbine 114. The nacelle 142 can be supported relative to the core turbine 114 by a plurality of circumferentially-spaced apart outlet guide vanes 144. Furthermore, a downstream section 146 of the nacelle 142 can enclose an outer portion of the core turbine 114 to define a bypass airflow passage 148 therebetween.

As illustrated in FIG. 1, air 150 enters an inlet portion 152 of the turbofan engine 110 during operation thereof. A first portion 154 of the air 150 flows into the bypass airflow passage 148, while a second portion 156 of the air 150 flows into the inlet 120 of the LP compressor 122. One or more sequential stages of LP compressor stator vanes 170 and LP compressor rotor blades 172 coupled to the LP shaft 136 progressively compress the second portion 156 of the air 150 flowing through the LP compressor 122 en route to the HP compressor 124. Next, one or more sequential stages of HP compressor stator vanes 174 and HP compressor rotor blades 176 coupled to the HP shaft 134 further compress the second portion 156 of the air 150 flowing through the HP compressor 124. This provides compressed air 158 to the combustion section 126 where it mixes with fuel and burns to provide combustion gases 160.

The combustion gases 160 flow through the HP turbine 128 where one or more sequential stages of HP turbine stator vanes 166 and HP turbine rotor blades 168 coupled to the HP shaft 134 extract a first portion of kinetic and/or thermal energy therefrom. This energy extraction supports operation of the HP compressor 124. The combustion gases 160 then flow through the LP turbine 130 where one or more sequential stages of LP turbine stator vanes 162 and LP turbine rotor blades 164 coupled to the LP shaft 136 extract a second portion of thermal and/or kinetic energy therefrom. This energy extraction causes the LP shaft 136 to rotate, thereby supporting operation of the LP compressor 122 and/or rotation of the fan shaft 138. The combustion gases 160 then exit the core turbine 114 through the exhaust section 132 thereof. A turbine frame 161 with a fairing assembly is located between the HP turbine 128 and the LP turbine 130. The turbine frame 161 acts as a supporting structure, connecting a high-pressure shaft's rear bearing with the turbine housing and forming an aerodynamic transition duct between the HP turbine 128 and the LP turbine 130. Fairings form a flow path between the high-pressure and low-pressure turbines and can be formed using metallic castings (e.g., nickel-based cast metallic alloys, etc.).

Along with the turbofan engine 110, the core turbine 114 serves a similar purpose and is exposed to a similar environment in land-based gas turbines, turbojet engines in which the ratio of the first portion 154 of the air 150 to the second portion 156 of the air 150 is less than that of a turbofan, and unducted fan engines in which the fan section 116 is devoid of the nacelle 142. In each of the turbofan, turbojet, and unducted engines, a speed reduction device (e.g., the reduction gear 139) can be included between any shafts and spools. For example, the reduction gear 139 is disposed between the LP shaft 136 and the fan shaft 138 of the fan section 116.

As described above with respect to FIG. 1, the turbine frame 161 is located between the HP turbine 128 and the LP turbine 130 to connect the high-pressure shaft's rear bearing with the turbine housing and form an aerodynamic transition duct between the HP turbine 128 and the LP turbine 130. As such, air flows through the turbine frame 161 between the HP turbine 128 and the LP turbine 130.

FIG. 2 is a partial cross-sectional view of an example compressor 200 of a turbine engine (e.g., turbofan engine 110 of FIG. 1), including an example LP compressor (e.g., booster) stage 202 and an example HP compressor stage 204. FIG. 2 illustrates the example compressor 200 at a transition point 206 between the booster stage 202 and the HP compressor stage 204. The compressor 200 includes an example casing 208. In the illustrated example of FIG. 2, the casing 208 surrounds the booster stage 202 and the HP compressor stage 204. In additional or alternative examples, the booster stage 202 and the HP compressor stage 204 have distinct casings 208 connected via a linkage mechanism. The casing 208 surrounds rotor blades 210 of the compressor 200. In operation, the rotor blades 210 spin, impelling air downstream. The casing 208 defines an example mainstream flowpath 212 (e.g., a first flowpath) for airflow through compressor 200 (e.g., and the turbofan engine 110). In some examples, the casing 208 implements a means for defining a mainstream flowpath FIG. 2 illustrates an example variable bleed valve (e.g., VB valve, VBV, etc.) 214, including an example VBV port (e.g., passage, opening, duct, etc.) 216 that defines an example bleed flowpath (e.g., secondary flowpath) 218 and an example VBV door 220 located at an example VBV port exit 222. In some examples, the VBV port 216 implements a means for defining a secondary flowpath. The VB valve 214 may be actuated via an actuator. For the sake of simplicity, the actuator is not shown in examples disclosed herein. The actuator may move the VBV door 220 between an open position (e.g., to bleed air from the booster stage 202) and a closed position. In the closed position, the VBV door 220 covers the VBV port exit 222, closing off the VBV port 216.

In the closed position, the VBV door 220 is positioned at the VBV port 216 is a manner that produces an example bleed cavity (e.g., open space, chamber, etc.) 224. The resultant bleed cavity 224 disrupts the airflow as it flows through the mainstream flowpath 212, leading to acoustic resonance, compressor instabilities, and/or other issues. For example, a shear layer 226 of the mainstream airflow may separate as it reaches an upstream edge (e.g., end, lip, etc.) 228 of the VBV port 216. As the shear layer 226 separates, the shear layer 226 impinges a downstream edge (e.g., end, lip, etc.) 230 of the VBV port 216, leading to feedback in the form of acoustic pressure waves. The pressure wave feedback causes vorticity to shed into the shear layer in phase, causing resonant acoustic tones within the bleed cavity that may resonate with other mechanical components of the turbine engine and leading to the compressor instabilities and/or mechanical failure. Advantageously, examples disclosed herein eliminate or otherwise dampen the acoustic resonance.

Example VB valves are disclosed below that are similar to the VB valve 214 of FIG. 2. As such, the same reference numbers used for the structures shown in FIG. 2 are used for similar or identical structures in FIGS. 3-9. Further, details of the parts (e.g., VBV port 216, bleed flowpath 218, VBV door 220, VBV port exit 222, bleed cavity 224, upstream edge 228, downstream edge 230, etc.) are not repeated in connection with FIGS. 3-10. Similar to FIG. 2, examples below are integrated onto a casing 208 of a compressor 200, which defines a mainstream flowpath 212 for airflow through the turbofan engine 110.

Figure 3:
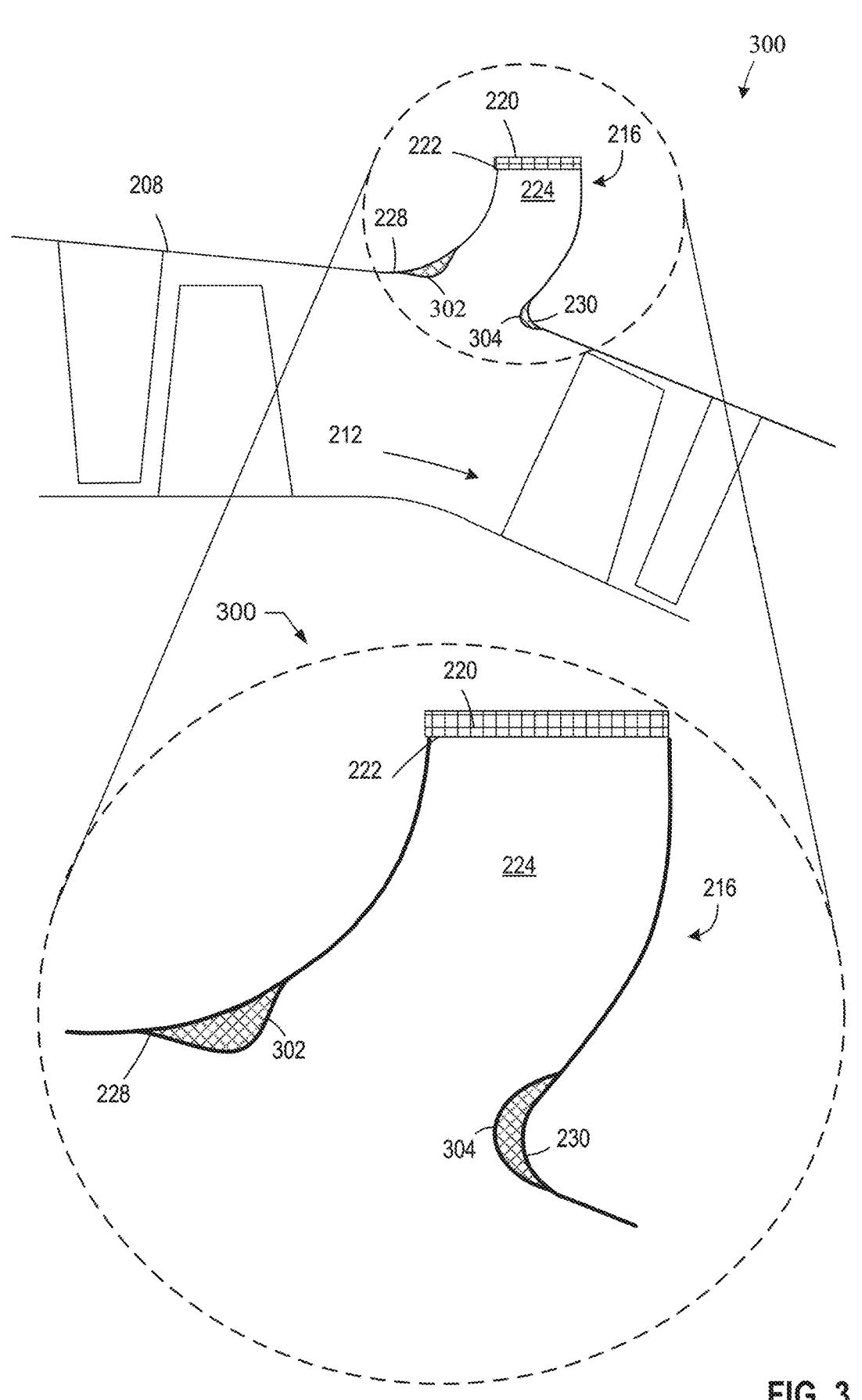
FIG. 3 is an illustration of an example variable bleed valve in accordance with the teachings of this disclosure.
Figure 6:
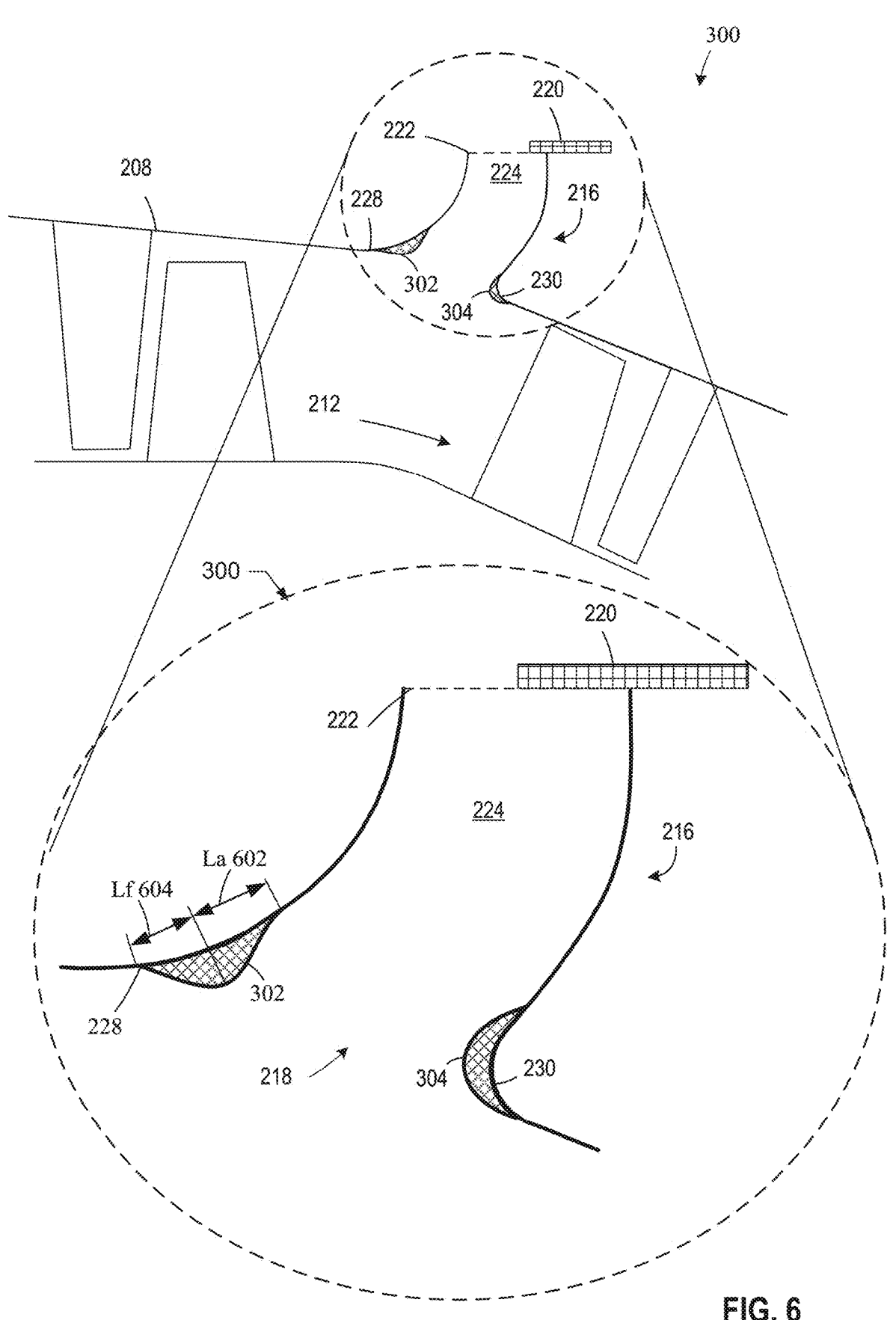
FIG. 6 illustrates the VBV of FIG. 3 is a second state.

FIG. 3 is an illustration of an example VB valve 300 structured in accordance with the teachings of this disclosure. FIG. 3 illustrates an enlarged view of the example VB valve 300. The VB valve 300 of FIG. 3 includes the example VBV port 216 having the example upstream edge 228 and the example downstream edge 230. The VB valve 300 can be considered a two-state system, having a first (e.g., closed) state and a second (e.g., open) state. FIG. 3 illustrates the VB valve 300 in the closed state while FIG. 6 illustrates the VB valve 300 in the open state. In the open state, the VBV door 220 is in an uncovered position that allows air to flow through the VBV port 216 and escape the VBV port exit 222 via the bleed flowpath 218. In the closed state, the VBV door 220 substantially covers the VBV port 216, preventing air from flowing through the VBV port 216. The position of the VBV door 220 over the VBV port 216 in the closed state creates the example bleed cavity 224. As noted above, as flow passes by the example bleed cavity 224, the bleed cavity leading to disruption of an operation of surrounding hardware in the turbine engine 110.

To address the foregoing issues, including the acoustic resonance, the VB valve 300 of FIG. 3 includes an example vortex generating device 302 at an upstream edge 228 of the VBV port 216. The vortex generating device 302 is a vorticity generating feature. In the illustrated example of FIG. 3, the vortex device is an undulated bump feature (e.g., tubercles, peaks and valleys, nodules, etc.) along an upstream edge 228 of the VBV port 216. In additional or alternative examples, the vortex generating device 302 may be any suitable device to break up the shear layer, such as a vortex generator and/or a serration feature along the upstream edge 228 of the VBV port 216. In some examples, the vortex generating device 302 is integrated into the casing 208 (e.g., via additive manufacturing, substrative manufacturing, etc.). In some examples, the vortex generating device 302 is coupled to the casing 208 at the upstream edge 228 of the VBV port 216. For example, the vortex generating device 302 may be fastened to the casing 208 via a welding process, via fasteners (e.g., screws, bolts, etc.), etc. In some examples, the vortex generating device 302 implements a means for disrupting the shear layer of the mainstream airflow.

The example vortex generating device 302 is structured to dampen the acoustic resonance emitted as a result of the airflow separation as the air flows across the example bleed cavity 224 impinging the downstream edge 230 of the VBV port 216. The point of shear layer separation occurs at the upstream edge 228 of the VBV port 216. At the point of shear layer separation, the vortex generating device 302 is structured to generate streamwise vortices (e.g., via tubercles, serrations, etc.) to disperse a turbulence of the shear layer separation and weaken the acoustic resonance response at the downstream edge 230. In other words, the vortex generating device 302 mixes the shear layer convecting over the bleed cavity 224 to weaken the acoustic resonance with the bleed cavity 224, thus eliminating or otherwise reducing a source of excitation of booster stage turbomachinery 202.

In some examples, the VB valve 300 includes an example interaction decorrelating device 304 at a downstream edge 230 of the VBV port 216. The interaction decorrelating device 304 is similar in structure to the vortex generating device 302. The interaction decorrelating device 304 may include the same or similar features of the vortex device. Further, the interaction decorrelating device 304 may be manufactured in a same or similar manner as the vortex device. However, the vortex generating device 302 and the interaction decorrelating device 304 have different effects on the airflow as it flows through the turbine engine 110. That is, the interaction decorrelating device 304 operates in a different manner than the vortex generating device 302. The vortex generating device 302 reduces an energy of the shear layer at the downstream edge 230, thus reducing the acoustic response at the downstream edge 230. On the other hand, the interaction decorrelating device 304 is structured to decorrelate circumferentially an unsteady pressure response to an incoming shear layer impingement on the flowpath corner to further desensitize the resonance.

Figure 4A:
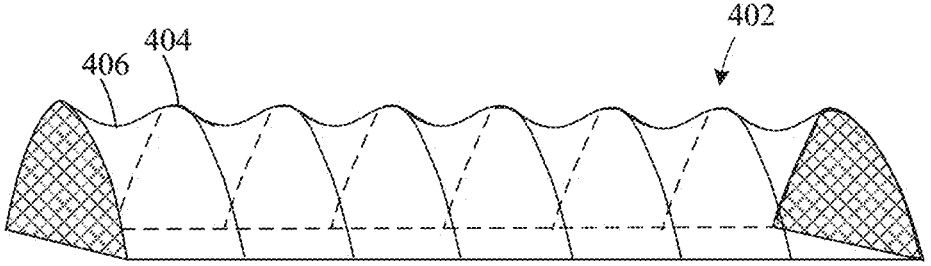
FIG. 4A illustrates an example tubercle-shaped device.
Figure 4B:
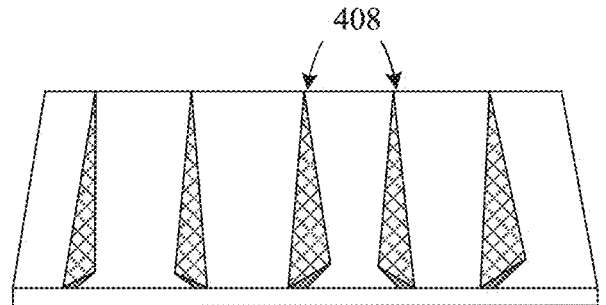
FIG. 4B illustrates an example vortex generator-shaped device.
Figure 4C:
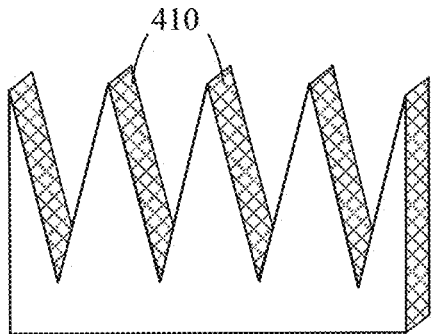
FIG. 4C illustrates an example serration-shaped device.

FIGS. 4A-4C illustrate possible shapes of an example vortex device (e.g., vortex generating device 302) and/or an interaction decorrelating device (e.g., interaction decorrelating device 304). FIG. 4A illustrates an example tubercle-shaped device 302, 304. The tubercle-shaped vortex generating device 302, 304 includes an undulate bump feature 402

(e.g., a plurality of nodules) at an edge (e.g., upstream edge 228 and/or downstream edge 230) of the VBV port 216. The undulated bump feature 402 includes a plurality of peaks 404 and valleys 404. FIG. 4B illustrates an example vortex generator device 302, 304. The vortex generator device 302, 304 includes a plurality of vanes 408 at the edge 228, 230 of the VBV port 216. FIG. 4C illustrates an example serration device 302, 304. The serration device 302, 304 includes a plurality of serrations (e.g., tooth-like projections) 410 at the edge 228, 230 of the VBV port 216. The vortex generating device 302 may include other shapes not disclosed herein that disrupt a shear layer of airflow at a point of separation. The interaction decorrelating device 304 may include other shapes not disclosed herein that decorrelate circumferentially an unsteady pressure response to an incoming shear layer impingement on the flowpath corner.

Figure 5:
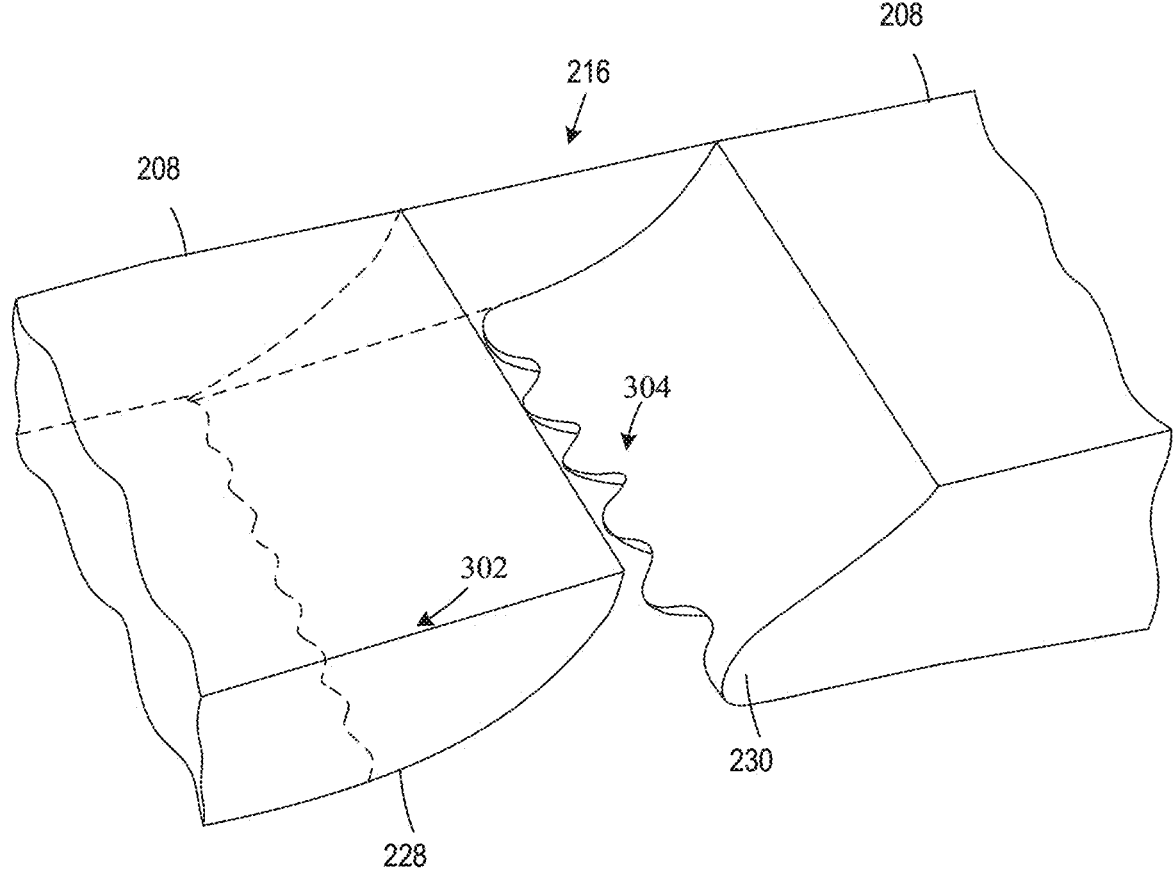
FIG. 5 is a partial cross-sectional view of the example VBV port of FIG. 3.

FIG. 5 is a partial schematic view of the VB valve 300 of FIG. 3, including the example vortex generating device 302 and the example interaction decorrelating device 304. A width of the respective device 302, 304 extends along the respective edge 228, 230 of the VBV port 216. To mix the shear layer, the vortex generating device 302 must be placed near the point of separation and extend radially inwards such that the vortex generating device 302 disrupts a shear layer of the mainstream airflow. That is, the vortex generating device 302 must extend into the mainstream airflow enough that the vortex generating device 302 generates the streamwise vortices of sufficient strength to mix the shear layer. The interaction decorrelating device 304 must extend into the mainstream airflow enough that the interaction decorrelating device 304 decorrelates the pressure response to the incoming shear layer impingement on the downstream flowpath edge 230. As such, vortex generating device 302 and/or the interaction decorrelating device 304 is not a single, continuous protuberance. Rather, the vortex generating device 302 and/or the interaction decorrelating device 304 includes a series of protuberances along a distance of the respective edge 228, 230 of the VBV port 216.

FIG. 6 illustrates the example VB valve 300 of FIG. 3 in the second state. The vortex generating device 302 of FIG. 6 is an undulated bump feature. As noted above, the VB valve 300 is structured for the two-state system (e.g., the first state of FIG. 3 and the second state of FIG. 6). In the first state, the VB valve 300 is closed, blocking air from flowing through the bleed flowpath 218. In the first state, the vortex generating device 302 operates as a vorticity generating feature (e.g., a shear layer destroyer), as described above. The peaks and valleys of the vortex generating device 302 are dimensioned such that the vortex generating device 302 penetrates the shear layer near the point of separation to mix out the shear layer.

In the second state, the VB valve 300 is in the open position. As such, a portion of the airflow flows over the vortex generating device 302, through the VBV port 216, and out the VBV port exit 222. A length of the vortex generating device 302 is dimensioned to avoid a total pressure loss of such secondary airflow and facilitate a smooth flow of air through the bleed flowpath 218. The length of the vortex generating device 302 is defined by a distance that includes an example aft length, La 602, and example forward length, Lf 604. To properly dimension the length of the vortex generating device 302, La 602 is greater than Lf 604.

Figure 7:
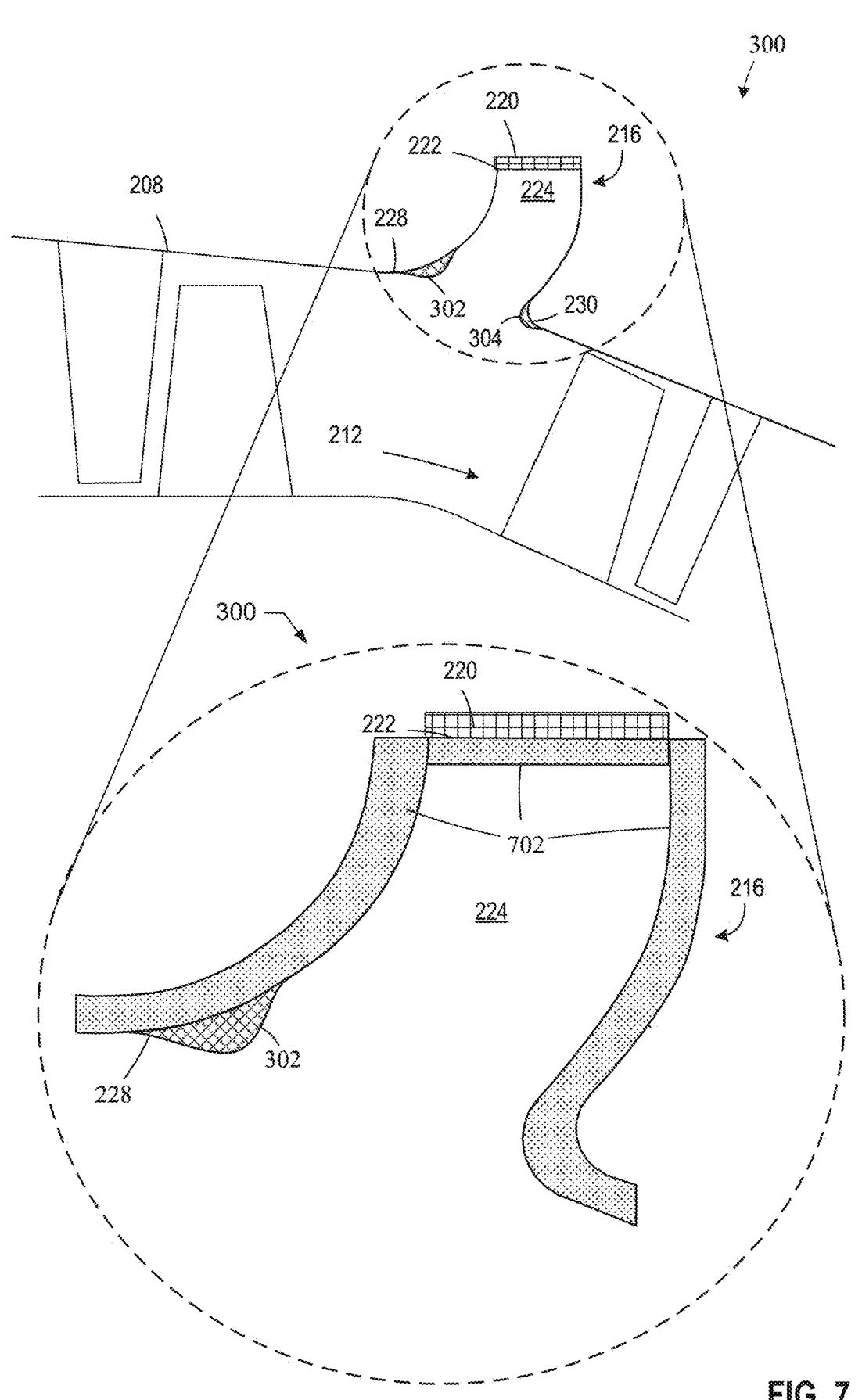
FIG. 7 is an illustration of another example variable bleed valve in accordance with the teachings of this disclosure.

FIG. 7 is an illustration of another example VB valve 700 for the example compressor 200, including an enlarged view of the VB valve 700 structured in accordance with the teachings of this disclosure. The VB valve 700 is similar to the VB valve 300 of FIG. 3. As such, VB valve 700 of FIG. 7 includes the example VBV port 216 having the example upstream edge 228 and the example downstream edge 230. The VB valve 700 also includes the vortex generating device 302 at the upstream edge 228 of the VBV port 216. The VB valve 700 of FIG. 7 includes an example acoustic liner 702 structured to attenuate an acoustic tone generated in the bleed cavity 224. Acoustic resonance is at least partially determined by a reflectivity of a surface reflecting the acoustic waves. As such, the acoustic liner 702 is structured to reduce reflection of acoustic waves from the wall(s) of the bleed cavity to reduce the acoustic resonance. In some examples, the acoustic liner 702 defines at least one wall of the bleed cavity 224. In some examples, the acoustic liner 702 defines an underside (e.g., radially inward side) of the VBV door 220, also referred to herein as a wall of the bleed cavity 224.

The acoustic liner 702 includes a porous face sheet (e.g., and/or wire mesh layer) behind which rests a plurality of resonant chambers (e.g., cavities). The acoustic liner 702 attenuates the acoustic tone(s) via the porous face sheet and the resonant chambers. The porous face sheet acts as the wall(s) of the bleed cavity 224. The porous face sheet includes a plurality of apertures (e.g., holes). The apertures may be in any shape, such as those illustrated in FIG. 9. The porous face sheet of the acoustic liner 702 is structured to allow the acoustic waves generated within the bleed cavity 224 to enter the plurality of resonant chambers. In operation, at least a portion of the acoustic waves generated in the bleed cavity 224 pass through the porous face sheet and enter the resonant chambers. The porous face sheet is further structured to give a resistance to the acoustic waves to allow the resonant chamber to attenuate the acoustic waves even further.

To attenuate the acoustic tone(s), the resonant chambers behind the porous face sheet are tuned to a frequency of the acoustic tones (e.g., a resonant frequency) to silence (e.g., deadens, etc.) the acoustic waves of the bleed cavity 224 resonance. That is, the resonant chambers of the acoustic liner 702 are tuned to a frequency of the acoustic tone to silence a reflection of the acoustic wave. For example, each of the resonant chambers is tuned to a frequency of the acoustic tones generated as a result of the shear layer impinging the downstream edge 230 of the VBV port 216. The acoustic waves that enter the resonant chambers are thus attenuated, reducing an overall tone generated within the bleed cavity 224. The frequency may be determined using any suitable method to determine an acoustic frequency. For example, the frequency may be determined based on classical theories and/or unsteady analysis methods to determine a resonant frequency.

The example acoustic liner 702 can be any acoustic liner capable of attenuating an acoustic tone. In some examples, the acoustic liner 702 is a single degree-of-freedom (SDOF) acoustic liner 702. In such examples, the acoustic liner 702 is tuned to a single frequency. In some examples, the acoustic liner 702 is a dual degree-of-freedom (DDOF) acoustic liner. In such examples, the acoustic liner 702 is tuned to two frequencies. In some examples, the acoustic liner 702 is a multi-degree-of-freedom (MDOF) liner. In such examples, the acoustic liner 702 is tuned to two or more frequencies. The acoustic liner 702 may include other type of acoustic liner additionally or alternatively, such as a simple honeycomb acoustic liner, a slanted/wrap-around acoustic liner, a Helmholtz acoustic liner, etc.

The acoustic liner 702 may be manufactured at the walls of the VBV port 216 and/or underside of the VBV door 220 using any suitable method. In some examples, the acoustic liner 702 integrated into the VBV port 216 via an additive manufacturing process. In some examples, the VBV port 216 is manufactured first, and the acoustic liner 702 manufactured onto the VBV port 216. For example, the acoustic liner 702 may be manufactured via a direct electrical discharge machine (EDM) and/or another hole machining device.

Figure 8:
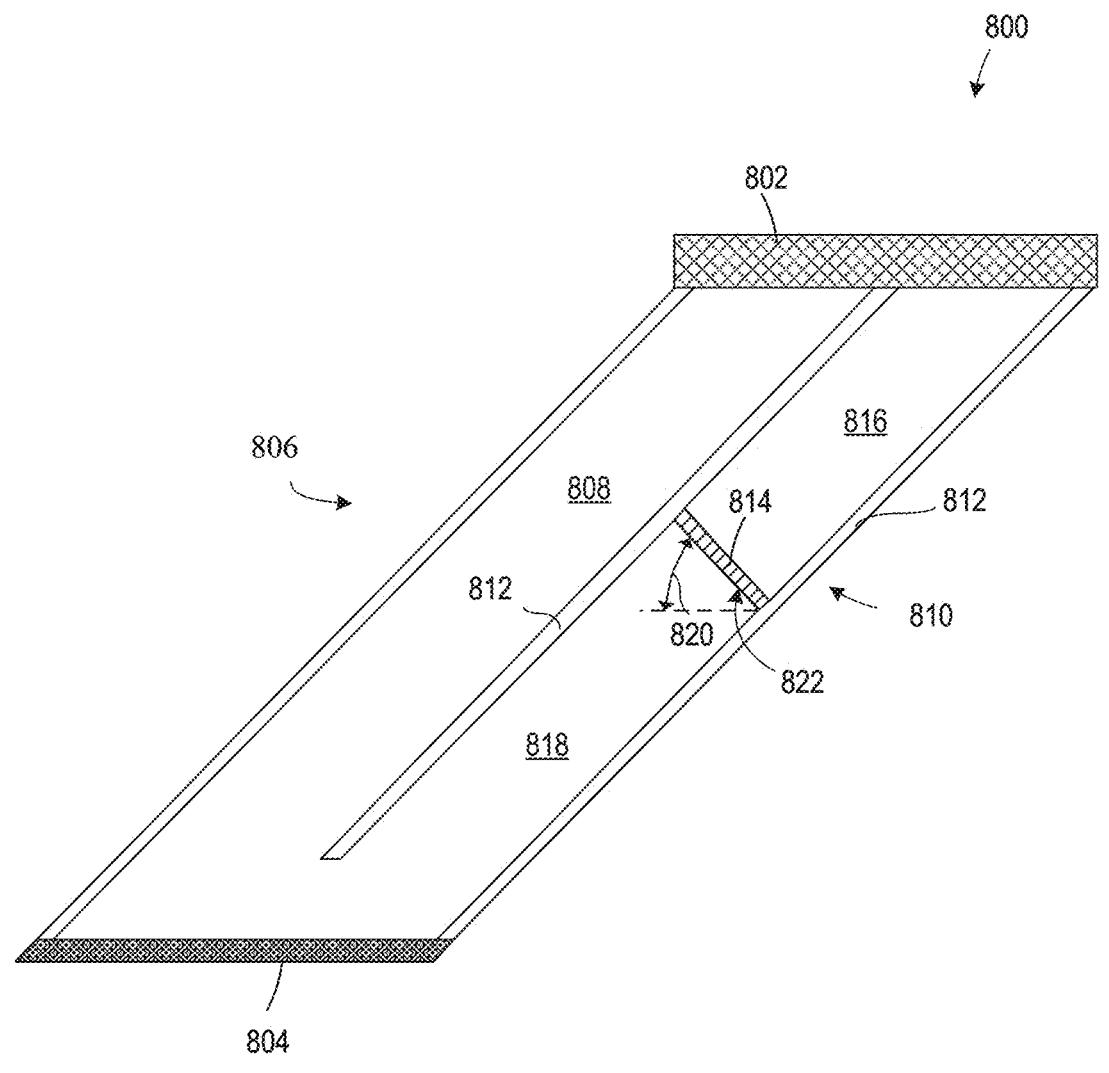
FIG. 8 is an illustration of an example multi-degree-of-freedom acoustic liner which may be used in disclosed examples.

FIG. 8 is an illustration of an example MDOF acoustic liner 800 which may be used to define a wall of the bleed cavity 224. While the example of FIG. 8 illustrates a DDOF implementation, the concept can be extended to other MDOF configurations for controlling cavity acoustics across a range of operating conditions when the VBV is closed. The MDOF 800 is an acoustic liner that can be tuned to more than two frequencies. The example MDOF 800 includes a porous face sheet 802 at a first end, a back sheet 804 at a second end, and an acoustic core 806 positioned therebetween. The porous face sheet 802 defines a wall of a bleed cavity (e.g., bleed cavity 224). The acoustic core 806 includes a plurality of resonant chambers, such as a first resonant chamber 808 and a second resonant chamber 810. The resonant chambers 808, 810 may include one or more resonant spaces. The example resonant chambers 808, 810 are defined by example cell walls 812 and top and bottom faces (not illustrated in examples disclosed herein). In some examples, the resonant chamber 810 may be further defined by an example partition 814.

The partition 814 may transect at least a portion of a resonant chamber 810, thereby delineating an upper resonant space 816 from a lower resonant space 818. For example, the partition 814 may transect the resonant chamber 810 at an interface angle 820 determined from a plane parallel to a bottom face and/or a top face of the acoustic core 806. The partition 814 may include a surface this has an interface angle 820 that is parallel, oblique, and/or perpendicular relative to the bottom face and/or a top face of a corresponding resonant chamber 810. Further, the partition 814 may include an aperture 822 to enable a propagation of an acoustic wave from the upper resonant space 816 to the lower resonant space 818. In certain examples, the aperture 822 of the partition 814 may include a porous resistance septum (e.g., a porous sheet of one or more holes/apertures, a porous septum/fabric/wire mesh layer, etc.). Accordingly, the first resonant chamber 808 may be tuned to a different frequency than the second resonant chamber 810. Further, the partition 814 of the second resonant chamber 810 allows the second resonant chamber 810 to be tuned to two frequencies. For example, the upper resonant space 816 may be tuned to a different frequency than the lower resonant space 818. Thus, low-frequency absorption can be optimized or otherwise improved within a tight packing volume (e.g., e.g., on axial and/or circumferential slant angles, etc.).

Figure 9:
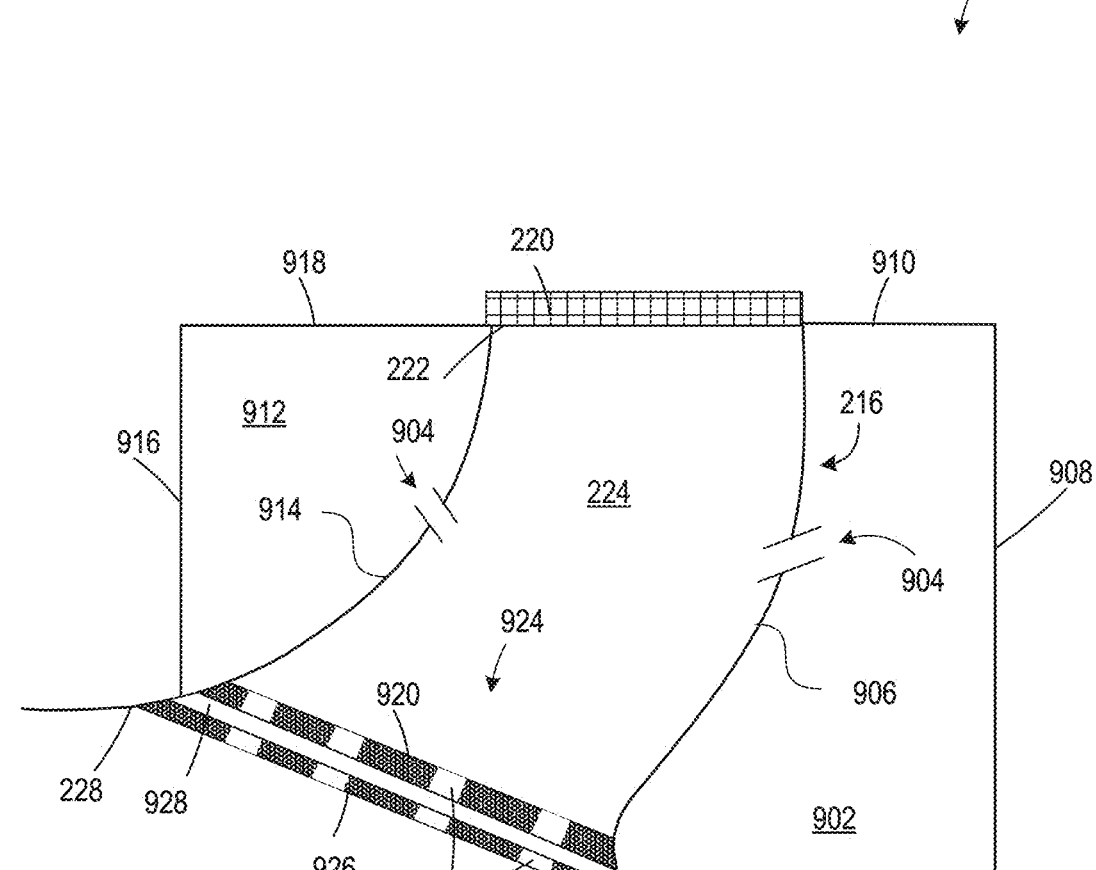
FIG. 9 is an illustration of another example variable bleed valve in accordance with the teachings of this disclosure.

FIG. 9 is an illustration of another example VB valve 900 structured in accordance with the teachings of this disclosure. The VB valve 900 of FIG. 9 includes an example resonant chamber (e.g., cavity) 902 downstream of the VBV port 216. For example, the resonant chamber 902 may be a Helmholtz resonant chamber. In such examples, the resonant chamber includes a neck (e.g., extension, tube, etc.) at an opening of the resonant chamber 902. The resonant chamber 902 is structured to eliminate or otherwise reduce the acoustic tones generated in the bleed cavity 224. As such, the resonant chamber 902 is tuned to a frequency of the generated acoustic tones. In operation, acoustic tones generated in the bleed cavity 224 enter the resonant chamber 902 via an example opening 904 of an aft wall 906 of the bleed cavity 224. Because the resonant chamber 902 is tuned to the frequency of the acoustic waves, the acoustic waves that enter the resonant chamber 902 are attenuated (e.g., deadened). The resonant chamber 902 may be tuned to the frequency of the generated acoustic tones by adjusting a geometry (e.g., shape, volume, etc.) of the resonant chamber 902.

The resonant chamber 902 is defined by the aft wall 906 of the bleed cavity 224, an example downstream wall 908, and an example top (e.g., lid, ceiling, etc.) 910. In some examples, the downstream wall 908 is a firewall of the turbine engine 110. The example opening 904 extends in the circumferential direction. The resonant chamber 902 may be tuned by adjusting a shape and/or size of the opening 904. Example shapes are illustrated in FIG. 9, discussed below.

In some examples, the VB valve 900 includes an additional or alternative resonant chamber 912 forward of the bleed cavity 224. The resonant chamber 912 is defined by a forward wall 914 of the bleed cavity 224, an upstream wall 916, and an example top (e.g., lid, ceiling, etc.) 918. Acoustic tones enter the resonant chamber 912 via an additional or alternative opening 904. In some examples, the opening 904 extends from the aft resonant chamber 902 to the forward resonant chamber 912. In some examples, the aft resonant chamber 902 and the forward resonant chamber 912 have different openings 904. In some examples, the aft resonant chamber 902 and/or the forward resonant chamber 912 include a plurality of openings 904.

In some examples, the VB valve 900 includes an example porous face sheet (e.g., and/or a wire mesh layer) 920 at an entrance of the bleed cavity 224. The porous face sheet 920 may extend from an upstream edge 228 of the bleed cavity 224 towards a downstream edge 230 of the bleed cavity 224. As noted above, the porous face sheet includes a plurality of apertures 922. The porous face sheet 920 is structured for a two-state system. In an open state, the porous face sheet 920 allows air to flow through the porous face sheet 920 via the plurality of apertures 922. The airflow through the porous face sheet 920 flows throughs through the VBV port 216 and exits through the VBV exit 222 in operation. In a closed position, the porous face sheet 920 provides a resistance to acoustic tones entering the bleed cavity 224.

In some examples, the VB valve 900 includes an example sandwich structure 924 at the entrance of the bleed cavity 224. The sandwich structure 924 is structured to reduce a frequency of the acoustic tones generated in the bleed cavity 224. The sandwich structure 924 includes a first porous face sheet (e.g., porous face sheet 920) spaced apart from a second porous face sheet 926. In some examples, the porous face sheets 920, 926 of the sandwich structure 924 include the plurality of apertures (e.g., holes) 922 that are lined up with respect to each other. The apertures 922 may be in any shape, such as those illustrated in FIG. 9. The sandwich structure 924 of FIG. 9 can be tuned to the frequency of the acoustic tones by adjusting the shape and/or a size of the apertures 922. Between the first porous face sheet 920 and the second porous face sheet 926 rests an example volume gap 928. The volume gap 928 may be tuned to a frequency of the acoustic tones generated within the bleed cavity 224 to further attenuate acoustic tones generated as a result of the shear layer impinging the downstream edge 230 of the VBV port 216.

The VB valve 900 includes the example VBV port 216 and the example VBV door 220. The VB valve 900 is structured for a two-state system (e.g., an open state and a closed state). In the open state, the apertures 922 of the porous face sheet(s) 920, 926 allow air to bleed from the VBV port 216 via the bleed flowpath 218. In the closed state, the resonant chamber(s) 902, 912, the porous face sheet 920, 926, and/or the sandwich structure 924 are structured to eliminate or otherwise reduce acoustic resonance in the bleed cavity 224. In the closed state, the porous face sheet(s) 920, 926 provide resistance to acoustic tones entering the bleed cavity 224. In the closed state, the resonant chamber 902, 912 and/or a volume gap of the sandwich structure 924 are tuned to a frequency of the acoustic tones to attenuate the acoustic tones. In some examples, the resonant chamber(s) 902, 912 and/or the sandwich structure 924 implement a means for attenuating an acoustic resonant response.

Figure 10:
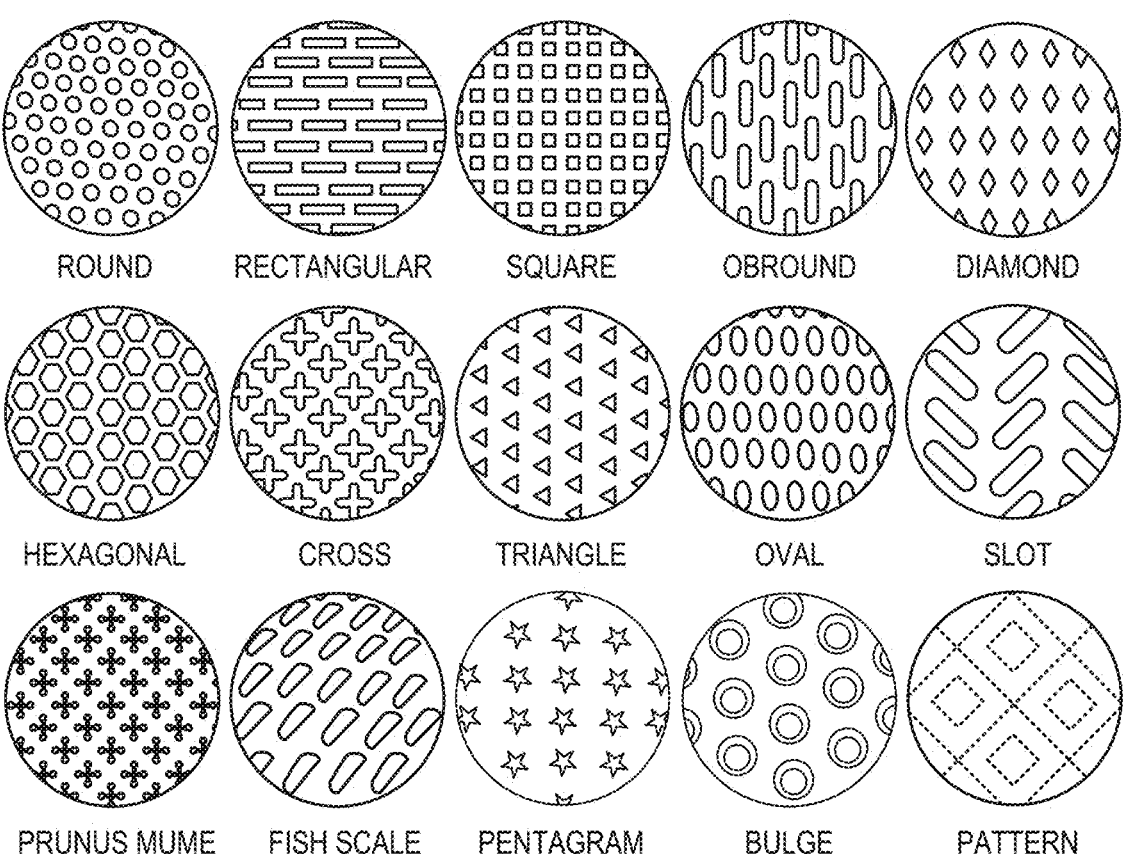
FIG. 10 illustrates a variety of aperture shapes.

FIG. 10 illustrates a variety of illustrative shapes that may be used for an opening (e.g., aperture) 904 of a resonant chamber 902, 912 and/or an aperture of a porous face sheet (e.g., of an acoustic liner 702, a porous face sheet 920, and/or a sandwich structure 924). In some examples, acoustic wave propagation characteristics may be tuned to a desired frequency at least in part by a configuration of the one or more apertures. As airflow flows through ones of the variety of shapes, different frequencies are generated. Accordingly, the shapes can be used to tune a frequency of the resonant chamber 902, 912 and/or the porous face sheet(s) 920, 926 by adjusting a shape of the entrance of the resonant chamber 902, 912 and/or a shape of the apertures 922 of the porous face sheet(s) 920, 926. Further, when a VB valve 300, 600, 900 operates in a closed state, only oscillatory flow in and/or out of the bleed cavity 224 can occur. The shape(s) of the apertures 922 in the porous face sheet(s) are used to provide an acoustic resistance to dampen an unsteady motion and an acoustic energy associated with it.

Example VB valves 300, 700, 900 disclosed above have a variety of features. In some examples, VB valve 300, 700, 900 includes a vortex generating device 302 at an upstream edge 228 of a VBV port 216. In some examples, the VB valve 300, 700, 900 includes an interaction decorrelating device 304 at a downstream edge 230 of the VBV port 216. In some examples, the VB valve 300, 700, 900 includes an acoustic liner 702 defining a wall of the VBV port 216. In some examples, the VB valve 300, 700, 900 includes at least one resonant chamber 902, 912 positioned adjacent a wall of the bleed cavity 224. In some examples, the VB valve 300, 700, 900 includes a porous face sheet 920 and/or a sandwich structure 924 having two porous face sheets 920, 926 with a volume gap 928 positioned therebetween.

Although each example VB valve 300, 700, 900 disclosed above has certain features, it should be understood that it is not necessary for a particular feature of one example VB valve 300, 700, 900 to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features. Features of the VB valve 300, 700, 900 disclosed above may be combined, divided, re-arranged, omitted, eliminated, and/or implemented in any other way.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, apparatus, and articles of manufacture have been disclosed that enable manufacture of an advantageous VB valve. Examples disclosed herein enable manufacture of a bleed port that disrupts of a shear layer of a mainstream airflow to generate streamwise vortices and reduce an energy of the shear layer. Certain examples decorrelate circumferentially an unsteady pressure response to an incoming shear layer impingement on a flowpath corner to further desensitize the resonant response. Examples disclosed herein enable a VB valve that eliminates or otherwise reduces an acoustic tone generated within a bleed cavity of a VBV port. Accordingly, examples disclosed herein improve aerodynamic efficiency and minimize or otherwise reduce aero-acoustic excitations in the bleed cavity.

Further aspects of the present disclosure are provided by the subject matter of the following clauses:

Example 1 includes a variable bleed valve apparatus comprising a variable bleed valve port including an upstream edge and a downstream edge, the VBV port to define a flowpath in a turbine engine, a variable bleed valve door to actuate the variable bleed valve apparatus, the VBV door to cover the VBV port in a closed position, and a vortex device at the upstream edge of the variable bleed valve port, the vortex device including a vorticity generating feature along the upstream edge of the variable bleed valve port.

Example 2 includes the variable bleed valve apparatus of any preceding clause, wherein the vorticity generating feature includes at least one of an undulated bump, a vortex generator, or a serration.

Example 3 includes the variable bleed valve apparatus of any preceding clause, wherein the vortex device includes the undulated bump, and wherein the undulated bump has a length defined by an aft length and a forward length, the aft length larger than the forward length.

Example 4 includes the variable bleed valve apparatus of any preceding clause, further including an interaction decorrelation device at the downstream edge of the variable bleed valve port to decorrelate an unsteady pressure response at the downstream edge.

Example 5 includes the variable bleed valve apparatus of any preceding clause, further including a resonant chamber, the variable bleed valve port including an opening to the resonant chamber, the resonant chamber tuned to a frequency of an acoustic tone generated within the variable bleed valve port in a closed position.

Example 6 includes the variable bleed valve apparatus of any preceding clause, wherein the resonant chamber is an acoustic liner defining at least one of a variable bleed valve port wall or a radially inward side of the variable bleed valve door, the acoustic liner tuned to the frequency of the acoustic tone generated within the variable bleed valve port in the closed position.

Example 7 includes the variable bleed valve apparatus of any preceding clause, wherein the resonant chamber is a Helmholtz resonant chamber, the opening including a neck extending into the resonant chamber.

Example 8 includes the variable bleed valve apparatus of any preceding clause, wherein the resonant chamber is a first resonant chamber, the variable bleed valve apparatus further including a second resonant chamber.

Example 9 includes the variable bleed valve apparatus of any preceding clause, further including a porous face sheet having a plurality of apertures positioned at an entrance of the variable bleed valve port, the porous face sheet tuned to a resistance for a frequency of acoustic tones generated within the variable bleed valve port.

Example 10 includes the variable bleed valve apparatus of any preceding clause, wherein the porous face sheet is a first porous face sheet, the variable bleed valve apparatus further including a second porous face sheet spaced apart from the first porous face sheet, the first porous face sheet and the second porous face sheet to define a sandwich structure having a volume gap therebetween, the volume gap tuned to a frequency of the acoustic tone generated within the variable bleed valve port in the closed position.

Example 11 includes a turbine engine comprising a low pressure compressor, a high pressure compressor, a casing surrounding the low pressure compressor and the high pressure compressor, the casing defining a primary flowpath, the casing including a bleed slot positioned between the low pressure compressor and the high pressure compressor, and a variable bleed valve at the bleed slot, the variable bleed valve defining a secondary flowpath and including a cavity including an upstream lip having at least a vortex device to disrupt a shear layer interacting with a downstream lip, and a blocker door to actuate the variable bleed valve, the blocker door to cover the cavity in a closed position, the blocker door to uncover the cavity in the open position.

Example 12 includes the turbine engine of any preceding clause, wherein the vortex device includes at least one of an undulated bump, a vortex generator, or a serration, and wherein the vortex device enables a smooth airflow of the secondary flowpath in the open position.

Example 13 includes the turbine engine of any preceding clause, wherein the vortex device includes the undulated bump, and wherein the undulated bump has a length defined by an aft length and a forward length, the aft length larger than the forward length.

Example 14 includes the turbine engine of any preceding clause, further including an interaction decorrelation device at the downstream lip to decorrelate an acoustic wave response of airflow impinging the downstream lip.

Example 15 includes the turbine engine of any preceding clause, further including at least one resonating chamber defining a wall of the cavity, the cavity including an opening to the at least one resonating chamber, the at least one resonating chamber tuned to a frequency of an acoustic tone generated within the cavity.

Example 16 includes the turbine engine of any preceding clause, wherein the at least one resonating chamber is positioned behind a porous face sheet to define an acoustic liner.

Example 17 includes the turbine engine of any preceding clause, wherein the at least one resonating chamber is a Helmholtz resonating chamber, and wherein the opening to the at least one resonating chamber includes a neck extending into the resonating chamber.

Example 18 includes the turbine engine of any preceding clause, further including a porous face sheet having a plurality of apertures positioned at an entrance of the bleed slot, the porous face sheet tuned to a resistance for a frequency of acoustic tones generated within the cavity.

Example 19 includes the turbine engine of any preceding clause, wherein the porous face sheet is a first porous face sheet, the turbine engine further including a second porous face sheet spaced apart from the first porous face sheet, the first porous face sheet and the second porous face sheet to define a sandwich structure having a volume gap between, the volume gap tuned to a frequency of the acoustic tones generated within the cavity.

Example 20 includes an apparatus comprising means for defining a mainstream flowpath means for defining a secondary flowpath, means for disrupting a shear layer of the mainstream flowpath h, and means for attenuating an acoustic resonance.

Although certain example systems, apparatus, and articles of manufacture have been disclosed herein, the scope of coverage of this patent is not limited thereto. On the contrary, this patent covers all systems, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A variable bleed valve apparatus including a liner to define a wall of a bleed cavity, wherein the liner comprises:

a first porous facesheet located at a first end of the bleed cavity;

a second porous facesheet located at a second end of the bleed cavity;

a first resonant chamber and a second resonant chamber, each positioned between the first porous facesheet and the second porous facesheet; and a partition, the partition to define an upper resonant chamber of the second resonant chamber and a lower resonant chamber of the second resonant chamber, wherein the upper resonant chamber is tuned to a different frequency than the lower resonant chamber.

2. The variable bleed valve apparatus of claim 1, wherein the partition is oriented at an interface angle.

3. The variable bleed valve apparatus of claim 2, wherein the interface angle is at least one of parallel, oblique, or perpendicular relative to the first porous facesheet or the second porous facesheet.

4. The variable bleed valve apparatus of claim 1, wherein the partition includes an aperture, the aperture to propagate an acoustic wave from the upper resonant chamber to the lower resonant chamber.

5. The variable bleed valve apparatus of claim 4, wherein the aperture includes a porous resistance septum.

6. The variable bleed valve apparatus of claim 5, wherein the porous resistance septum includes a porous sheet with at least one of: i) one or more holes, ii) a porous fabric layer, or iii) a porous wire mesh layer.

7. A turbine engine comprising:

a first compressor;

a second compressor; and a bleed port including a liner to define a wall of a bleed cavity, the liner including:

a first porous facesheet located at a first end of the bleed cavity;

a second porous facesheet located at a second end of the bleed cavity;

a first resonant chamber and a second resonant chamber, each positioned between the first porous facesheet and the second porous facesheet; and a partition, the partition to define an upper resonant chamber of the second resonant chamber and a lower resonant chamber of the second resonant chamber, wherein the upper resonant chamber is tuned to a different frequency than the lower resonant chamber.

8. The turbine engine of claim 7, wherein the partition is oriented at an interface angle.

9. The turbine engine of claim 8, wherein the interface angle is at least one of parallel, oblique, or perpendicular relative to at least one of the first porous facesheet or the second porous facesheet.

10. The turbine engine of claim 7, wherein the partition includes an aperture, the aperture to propagate an acoustic wave from the upper resonant chamber to the lower resonant chamber.

11. The turbine engine of claim 10, wherein the aperture includes a porous resistance septum.

12. The turbine engine of claim 11, wherein the porous resistance septum includes a porous sheet with at least one of: i) one or more holes, ii) a porous fabric layer, or iii) a porous wire mesh layer.

13. A liner of a bleed cavity, wherein the liner comprises:

a first porous facesheet located at a first end of the bleed cavity;

a second porous facesheet located at a second end of the bleed cavity;

a first resonant chamber and a second resonant chamber, each positioned between the first porous facesheet and the second porous facesheet; and a partition, the partition to define an upper resonant chamber of the second resonant chamber and a lower resonant chamber of the second resonant chamber, wherein the upper resonant chamber is tuned to a different frequency than the lower resonant chamber.

14. The liner of claim 13, wherein the partition is oriented at an interface angle.

15. The liner claim 14, wherein the interface angle is at least one of parallel, oblique, or perpendicular relative to at least one of the first porous facesheet or the second porous facesheet.

16. The liner of claim 13, wherein the partition includes an aperture, the aperture to propagate an acoustic wave from the upper resonant chamber to the lower resonant chamber.

17. The liner of claim 16, wherein the aperture includes a porous resistance septum.

18. The liner of claim 17, wherein the porous resistance septum includes a porous sheet with at least one of: i) one or more holes, ii) a porous fabric layer, or iii) a porous wire mesh layer.

* * * * *